United States Patent

Meissner et al.

[11] Patent Number: 5,846,156
[45] Date of Patent: Dec. 8, 1998

[54] ARRANGEMENT FOR ADJUSTING THE GEAR RATIO OF A CONTINUOUSLY ADJUSTABLE TRANSMISSION

[75] Inventors: Manfred Meissner, Marbach; Karl-Heinz Senger, Loechgau, both of Germany

[73] Assignee: Robert Bosch GmbH, Stuttgart, Germany

[21] Appl. No.: 824,790

[22] Filed: Mar. 26, 1997

[30] Foreign Application Priority Data

Mar. 26, 1996 [DE] Germany ............... 196 11 804.2

[51] Int. Cl.$^6$ ................................ F16H 59/18
[52] U.S. Cl. ............................................. 477/43
[58] Field of Search ............................. 477/43, 46

[56] References Cited

U.S. PATENT DOCUMENTS

| | | | |
|---|---|---|---|
| 4,515,040 | 5/1985 | Takeuchi et al. | 477/43 |
| 4,671,138 | 6/1987 | Nobumoto et al. | |
| 4,699,025 | 10/1987 | Omitsu | 477/43 |
| 4,735,114 | 4/1988 | Satoh et al. | 477/43 |
| 4,945,483 | 7/1990 | Tokoro | |
| 5,413,540 | 5/1995 | Streib et al. | |

FOREIGN PATENT DOCUMENTS

| | | |
|---|---|---|
| 0424088 | 4/1991 | European Pat. Off. |
| 0451887 | 10/1991 | European Pat. Off. |

*Primary Examiner*—Dirk Wright
*Attorney, Agent, or Firm*—Walter Ottesen

[57] ABSTRACT

An arrangement for adjusting a transmission, such that the gear ratio is continuously adjustable and the transmission is mounted between a vehicle engine and the vehicle wheels. An actuator which influences engine power is acted upon via an accelerator pedal controlled by the driver. In addition to the accelerator pedal position, the vehicle speed and/or the engine rpm are applied to adjust the transmission gear ratio. The adjustment of the transmission gear ratio is made in such a manner that a substantially linear relationship is obtained between the position of the accelerator pedal and the tractive force acting on the drive wheels. The advantage is that a linear characteristic is obtained between the accelerator pedal position and the tractive force (that is, the transmission output torque). The linear characteristic is obtained by a targeted configuration of characteristic fields stored in a microprocessor memory.

7 Claims, 6 Drawing Sheets

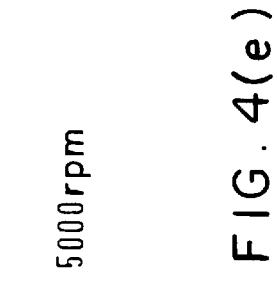
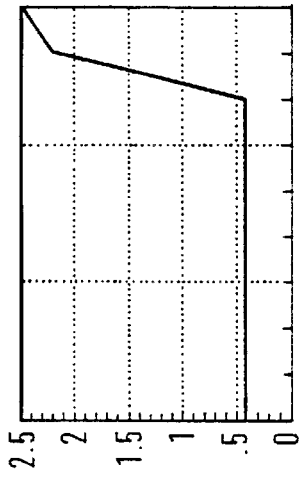
FIG. 4(a)
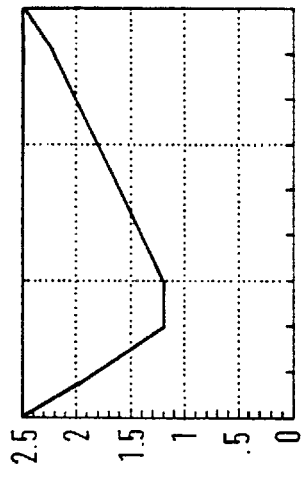
FIG. 4(b)
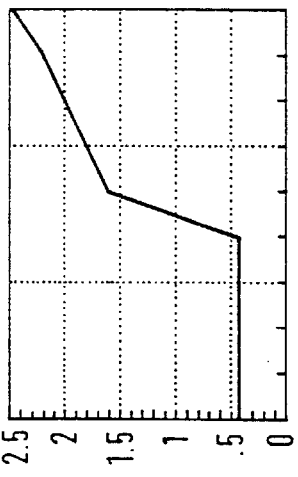
FIG. 4(c)
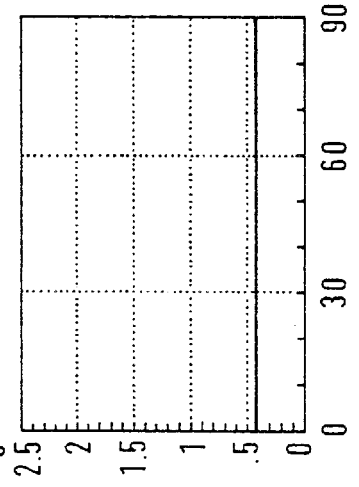
FIG. 4(d)
FIG. 4(e)
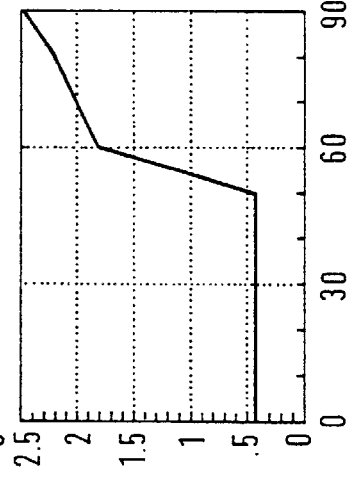
FIG. 4(f)

ARRANGEMENT FOR ADJUSTING THE GEAR RATIO OF A CONTINUOUSLY ADJUSTABLE TRANSMISSION

BACKGROUND OF THE INVENTION

The traction force, which is generated by the drive wheels of a motor vehicle, is determined by the torque at the transmission output (the output torque) or by the output power of the transmission. This traction force can be influenced by the two variables, namely, transmission ratio and engine torque. In a transmission, which can be continuously adjusted with respect to its gear ratio, the traction force can be varied as desired within the limits pregiven by the engine torque.

Continuously adjustable transmissions are disclosed, for example, in European Patent 0,451,887. The driver of the vehicle inputs the throttle flap position by actuating the accelerator pedal. The transmission gear ratio is adjusted in dependence upon the position of the accelerator pedal.

U.S. Pat. No. 5,413,540 discloses that the position of the accelerator pedal is not applied directly to control the power of the engine of the motor vehicle. Instead, an output torque desired by the driver is computed from the position of the accelerator pedal and the actual speed of the vehicle and, to realize this output torque, a corresponding engine torque and a transmission gear ratio adapted to the engine torque is adjusted. It is especially the decoupling of the accelerator pedal from the power control of the vehicle engine (for example, the throttle flap of a gasoline engine) which makes such a system relatively complex.

Because of favorable fuel consumption values, a high acceptance of continuously variable transmissions is achieved only via attractive driving programs. With the use of electronic ancillary means, known characteristic fields also continue to show the tendency that the engine is first revved up from a steady-state operating point after an actuation of the accelerator pedal and the vehicle is then accelerated. This relationship between the accelerator pedal position and the tractive force at the wheel is not linear.

SUMMARY OF THE INVENTION

It is an object of the invention to provide a comfortable relationship between the accelerator pedal position and the tractive force at the wheel utilizing simple means.

The arrangement of the invention is for adjusting a gear ratio of a continuously variable transmission mounted in a motor vehicle between the motor and the wheels thereof. The arrangement includes: an adjusting device for influencing the power generated by the motor; an accelerator pedal operatively connected to the adjusting device for operating on the adjusting device when the accelerator pedal is actuated by the driver of the vehicle; means for detecting the position of the accelerator pedal; means for detecting the road speed of the vehicle; means for detecting the rpm of the motor; means for adjusting the gear ratio of the transmission at least in dependence upon the position of the accelerator pedal and in dependence upon at least one of the road speed and the engine rpm; and, means for providing a substantially linear relationship between the position of the accelerator pedal and the tractive force acting on the wheels.

As mentioned, the invention proceeds from an arrangement for adjusting the gear ratio of a transmission which is continuously variable with respect to its gear ratio and which is mounted between a vehicle engine and the vehicle wheels. An actuator is charged via an accelerator pedal actuated by the driver of the vehicle and this actuator influences the engine power. Furthermore, and in addition to the accelerator pedal position, the vehicle speed and/or the engine rpm is applied to adjust the transmission gear ratio.

The essence of the invention is that the adjustment of the transmission gear ratio takes place in such a manner that a substantially linear relationship is achieved between the position of the accelerator pedal and the tractive force acting on the wheels of the vehicle.

The invention affords the advantage that a linear performance between the accelerator pedal position and the tractive force (that is, the transmission output torque) is achieved via a targeted design of the characteristic fields without it being necessary to use a so-called E-gas system. Such an E-gas system is characterized in that it is not the actuator controlling the engine power which is directly charged via the accelerator pedal position, but that the relationship between the accelerator pedal position and the engine power can be selected as desired. In the invention, this linear relationship can be established via a favorable selection of the characteristic fields for determining the desired gear ratio of the transmission as a function of the accelerator pedal position and as a function of the engine rpm or the vehicle speed over a wide range of use of the vehicle and without an E-gas system.

In an advantageous embodiment of the invention, a desired tractive force is determined from the position of the accelerator pedal in dependence upon the vehicle speed. Furthermore, it can be provided that a desired gear ratio is formed for adjusting the gear ratio in dependence upon the specific desired tractive force, while considering the position of the accelerator pedal and the vehicle speed.

In general, the maximum possible tractive force and the maximum and minimum possible gear ratios of the transmission are considered when determining the desired tractive force.

The above-mentioned relationships for adjusting the transmission gear ratios can be determined by means of computer algorithms and/or by means of characteristic fields and/or by means of interpolation. For a gasoline engine, the throttle flap is the actuator which determines the power of the vehicle engine. In the case of a diesel engine, it is the metering of fuel. According to the invention, these power-controlling actuators are directly driven by the accelerator pedal position.

BRIEF DESCRIPTION OF THE DRAWINGS

The invention will now be described with reference to the drawings wherein:

FIG. 4 is a characteristic field of the desired gear ratio as a function of accelerator pedal position;

DESCRIPTION OF THE PREFERRED EMBODIMENTS OF THE INVENTION

As already mentioned, it is an objective of the invention to provide a linear relationship between the accelerator pedal position and the tractive force or output torque of the transmission.

Figure 1:
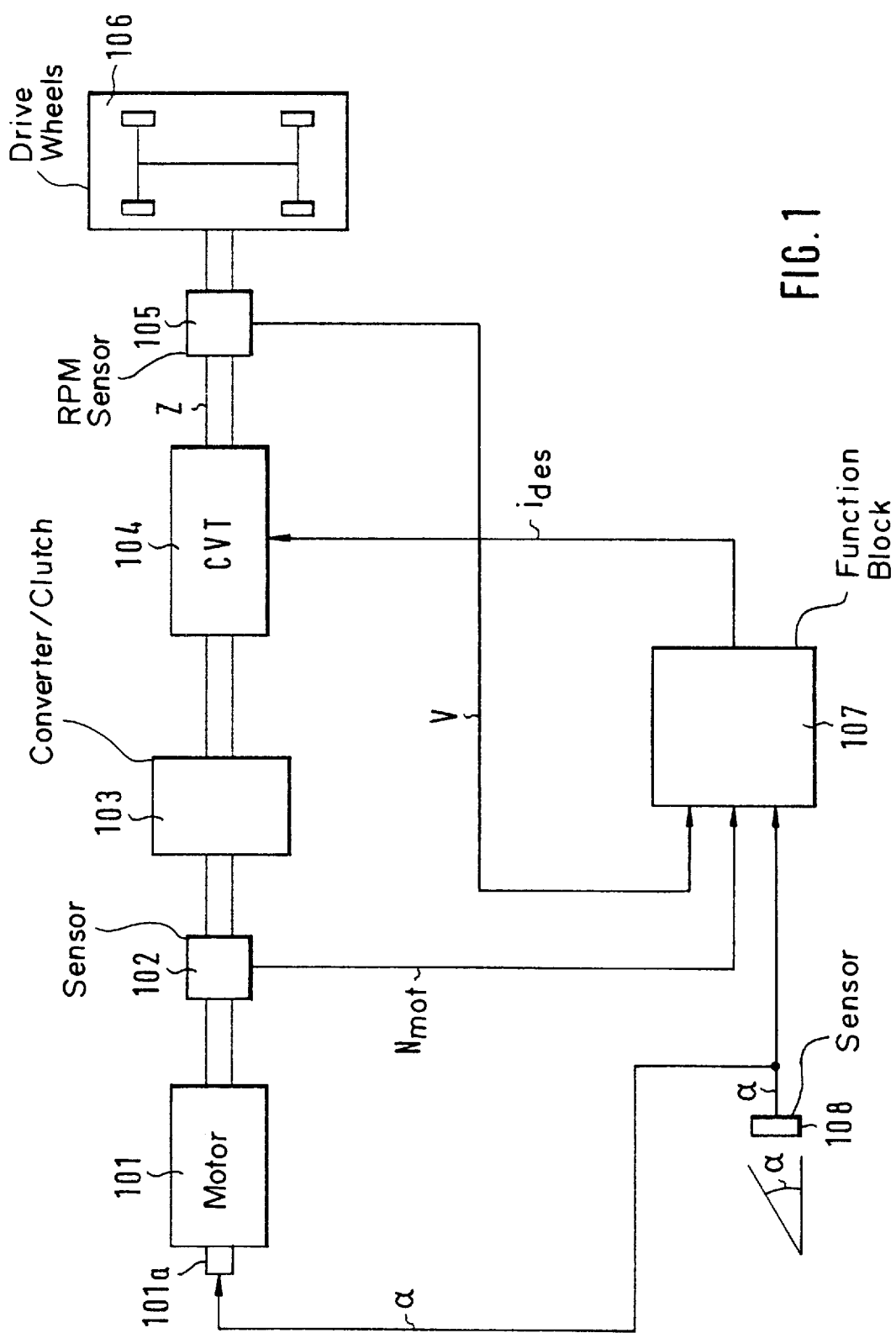
FIG. 1 is a block circuit diagram of the arrangement according to the invention.

To the above purpose, and as shown in FIG. 1, the position α of the accelerator pedal actuated by the driver is detected with the unit 108 and is supplied to the power actuator 101a of the vehicle motor 101. In a gasoline engine, this generally takes place via a pull cable in such a manner that the accelerator pedal position directly determines the throttle flap position. In a diesel engine, the position of the accelerator pedal essentially directly determines the injected quantity.

Because of the power actuator element 101a the vehicle motor 101 outputs an input torque to the continuously variable transmission CVT 104 via the converter or via the clutch 103. Depending upon the transmission gear ratio, this engine torque is transmitted as a tractive force, or drive torque, to the drive wheels of the vehicle, which are represented by block 106. The transmission gear ratio $i_{des}$ of the transmission 104 is determined in function block 107. For this purpose, the following are supplied to the function block 107: the accelerator pedal position α, the vehicle forward speed V and the engine rpm $N_{mot}$. The vehicle forward speed V is detected by the rpm sensor 105 and the engine rpm $N_{mot}$ is detected by the sensor 102.

Figure 2:
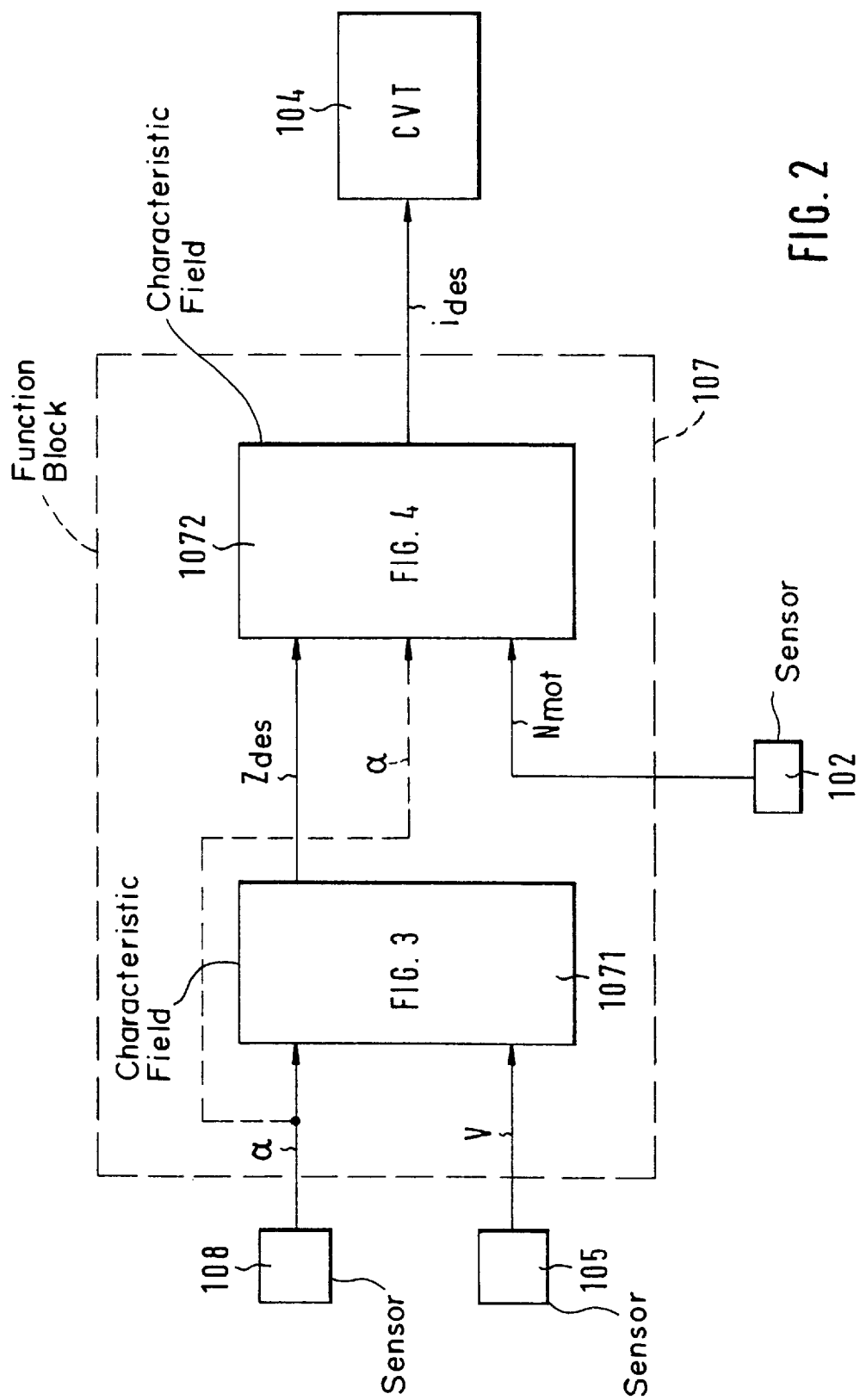
FIG. 2 is a block circuit diagram of function block 107 of FIG. 1.

The precise operation of the function block 107 will now be explained with reference to FIG. 2.

The accelerator pedal position α and the vehicle forward speed V are supplied to the block 1071 to obtain the desired linear relationship between the accelerator pedal position and the tractive force at the wheels. The block 1071 holds the characteristic field shown in FIG. 3.

Figure 3:
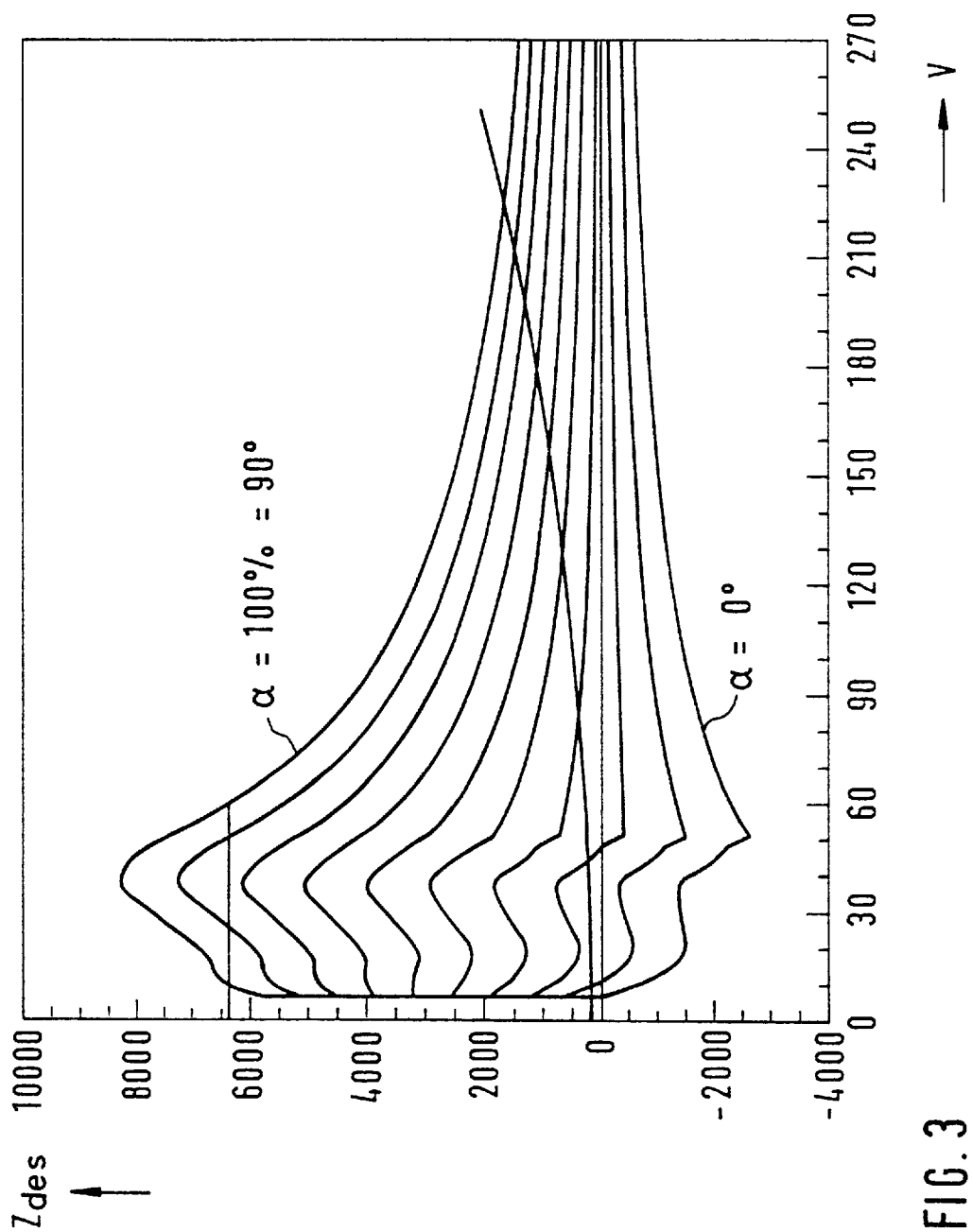
FIG. 3 is a characteristic field showing the desired tractive force as a function of the straight forward speed of the vehicle.

The desired tractive force $Z_{des}$ as a function of vehicle forward speed V is plotted for different accelerator positions α in the tractive force characteristic field shown in FIG. 3. The desired performance (linear relationship between accelerator pedal position and tractive force) according to the invention, is characterized by a uniform spacing of the lines for the same accelerator pedal position. If the characteristic lines are assigned to the accelerator pedal positions of 0° to 90°, then that transmission gear ratio $i_{des}$ can be determined from the actual desired value $Z_{des}$ for the tractive force with which precisely this desired value $Z_{des}$ is obtained with the transmission gear ratio $i_{des}$ for the actual accelerator pedal position α and the actual vehicle forward speed V. The limit curves for the accelerator pedal position 0° to 90° result from the engine characteristic field and a gear ratio variation with the vehicle speed.

In block 1071, a desired value $Z_{des}$ for the tractive force is read out from the characteristic field of FIG. 3 in dependence upon the accelerator pedal position α and the vehicle forward speed V. This desired value $Z_{des}$ is supplied to the function block 1072. In the block 1072, the desired gear ratio $Z_{des}$ for the transmission 104 is determined in dependence upon the desired tractive force $Z_{des}$ or in dependence upon the accelerator pedal position α and in dependence upon the engine rpm $N_{mot}$.

As an example, FIG. 4 shows the traces of the desired gear ratio $i_{des}$ for the engine rpm $N_{mot}$ =1000, 2000, 3000, 4000, 5000 and 6000 rpm. The resulting desired gear ratios can be computed either on line in the vehicle or can be stored in the characteristics fields and be determined via interpolation. The traces shown in FIG. 4 were additionally simplified in order to reduce the number of support points for the interpolation. For a low engine rpm $N_{mot}$, a high gear ratio is adjusted for very small accelerator pedal positions α (for very small throttle flap angles or for small injection quantities). In the mid range, the smallest possible gear ratio is used and only for large accelerator pedal angles is there a shift back to high gear ratios. With increasing engine rpm, the smallest gear ratio is used for low accelerator pedal angles and the gear ratio is then slowly shifted to high gear ratios.

Figure 5:
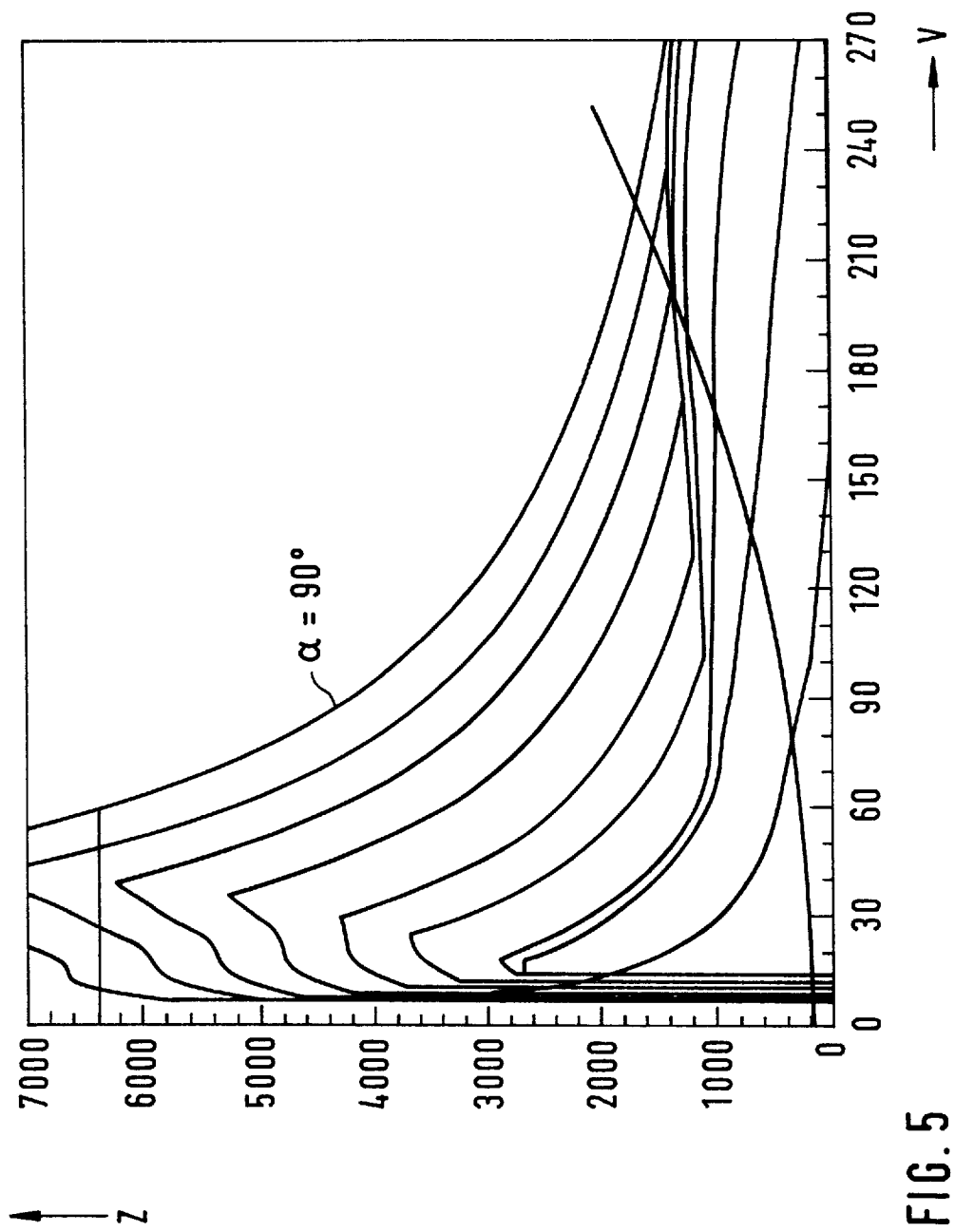
FIG. 5 shows the tractive force plotted against the straightforward speed of the vehicle; and, FIG. 6 shows the engine rpm plotted as a function of accelerator pedal position.

FIG. 5 shows a relationship between the accelerator pedal positions α, the vehicle longitudinal forward speed V and the tractive force Z which acts on the wheels and which is obtained with these simple characteristic lines described above. From FIG. 5, and from the parallel traces of the lines indicating an accelerator pedal position, one recognizes that already with these simple characteristic lines the desired linear tractive-force trace can be realized in wide ranges.

A further advantage of determining the gear ratio in accordance with the invention, is shown in the display of the shift characteristic lines in the form that the desired engine rpm $N_{mot}$ is plotted as a function of the accelerator pedal position α for constant vehicle forward speeds V. This is shown in FIG. 6.

Figure 6:
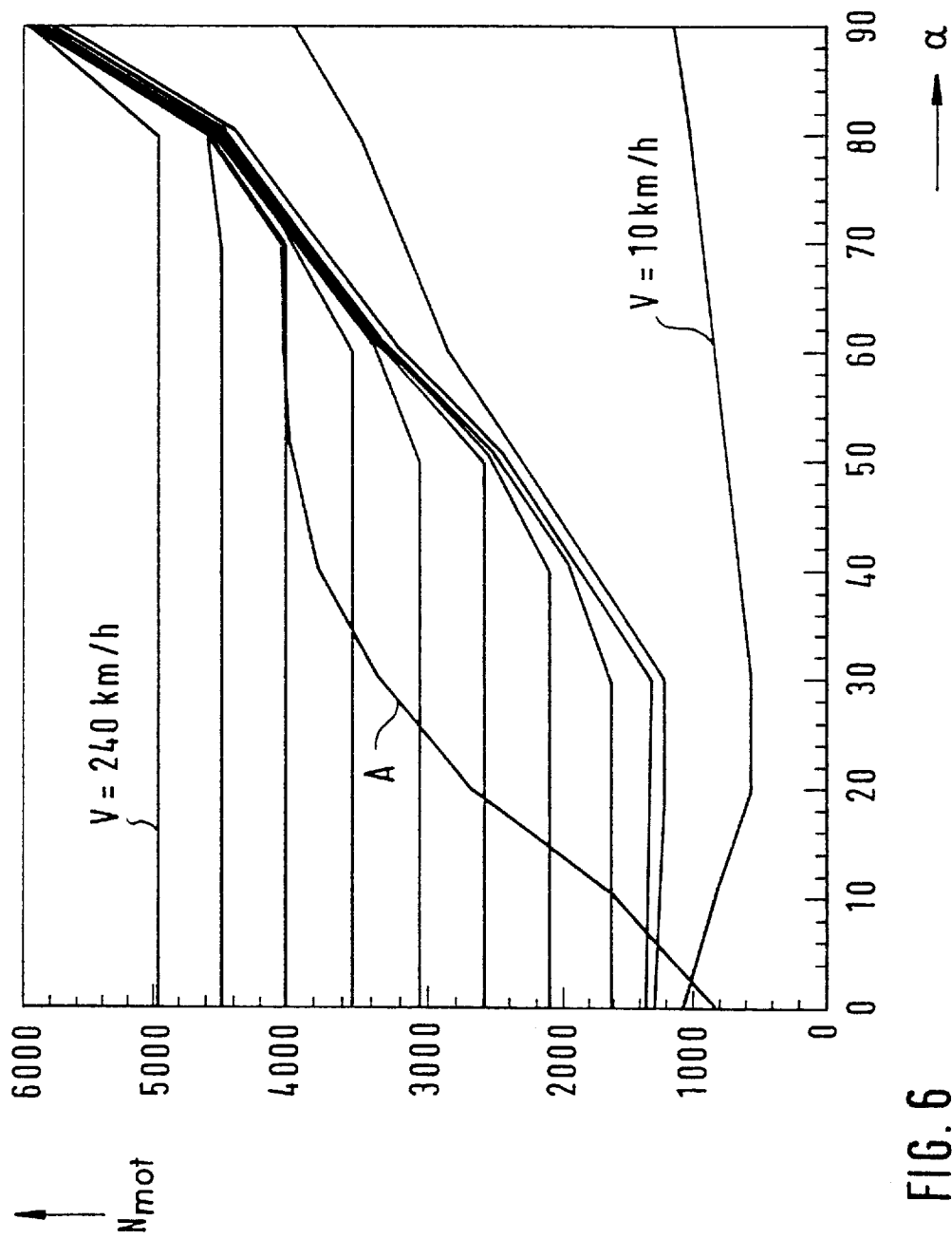

Line A is also drawn into FIG. 6. With reference to this line, the steady-state operating point (for travel in the plane without opposing wind) it has been shown that for low vehicle forward speeds V and slight changes in the accelerator pedal position, no shift in gear ratio takes place.

The above-mentioned unwanted performance of the continuously adjustable transmission (the tendency that the engine rpm first runs up after an actuation of the accelerator pedal from a steady-state operating point, and then the vehicle accelerates) is therefore suppressed. Only after significant changes of the accelerator pedal position, does a down shifting of the transmission gear ratio take place in order to adjust the high tractive force required by the driver.

It is understood that the foregoing description is that of the preferred embodiments of the invention and that various changes and modifications may be made thereto without departing from the spirit and scope of the invention as defined in the appended claims.

What is claimed is:

1. An arrangement for adjusting a gear ratio of a continuously variable transmission mounted in a motor vehicle between the motor and the wheels thereof, the arrangement comprising:

an adjusting device for influencing the power generated by said motor;

an accelerator pedal operatively connected to said adjusting device for operating on said adjusting device when said accelerator pedal is actuated by the driver of the vehicle;

means for detecting the position of said accelerator pedal;

means for detecting the road speed of said vehicle;

means for detecting the rpm of said motor; and, means for adjusting the gear ratio of said transmission at least in dependence upon said position of said accelerator pedal and in dependence upon at least one of said road speed and said engine rpm, so as to obtain a substantially linear relationship between said position of said accelerator pedal and the tractive force acting on said wheels.

2. The arrangement of claim 1, further comprising means for determining a desired tractive force from said position of said accelerator pedal in dependence upon said road speed.

3. The arrangement of claim 2, further comprising means for forming a desired gear ratio for adjusting the gear ratio of said continuously variable transmission; and, said desired gear ratio being formed in dependence upon said desired tractive force while considering said position of said accelerator pedal and said road speed.

4. The arrangement of claim 2, wherein the maximum possible tractive force and the maximal and minimal gear ratios are considered when determining said desired tractive force.

5. The arrangement of claim 1, further comprising means for determining quantities for adjusting the gear ratio of said continuously variable transmission; and, said quantities being determined utilizing at least one of the following: computation algorithms, characteristic fields and interpolation.

6. The arrangement of claim 1, wherein said adjusting device is a throttle flap directly driven by said accelerator pedal.

7. The arrangement of claim 1, wherein said adjusting device is a fuel-metering device directly driven by said accelerator pedal.

* * * * *